United States Patent
Moore et al.

(10) Patent No.: US 9,731,813 B2
(45) Date of Patent: Aug. 15, 2017

(54) METHODS AND APPARATUS TO CONTROL AIRCRAFT HORIZONTAL STABILIZERS

(71) Applicant: The Boeing Company, Chicago, IL (US)

(72) Inventors: Jonathan Kyle Moore, Kirkland, WA (US); Brian Charles Bock, Everett, WA (US); Edward E. Coleman, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 184 days.

(21) Appl. No.: 14/539,789

(22) Filed: Nov. 12, 2014

(65) Prior Publication Data

US 2016/0200419 A1    Jul. 14, 2016

(51) Int. Cl.
| | |
|---|---|
| *G05D 1/00* | (2006.01) |
| *G05D 1/08* | (2006.01) |
| *G05D 3/00* | (2006.01) |
| *B64C 13/16* | (2006.01) |
| *B64C 5/02* | (2006.01) |
| *B64C 5/06* | (2006.01) |
| *B64C 9/06* | (2006.01) |

(52) U.S. Cl.
CPC ............... *B64C 13/16* (2013.01); *B64C 5/02* (2013.01); *B64C 5/06* (2013.01); *B64C 9/06* (2013.01); *G05D 1/085* (2013.01)

(58) Field of Classification Search
CPC .. B64C 23/00; B64C 5/00; B64C 5/10; B64C 13/16; B64C 5/02; G05D 1/08; G05D 1/085

USPC ...................................... 701/4; 244/178, 181
See application file for complete search history.

(56) References Cited

U.S. PATENT DOCUMENTS

| | | | | |
|---|---|---|---|---|
| 3,667,223 | A | * 6/1972 | Thurston | ................ B64D 41/00 137/411 |
| 4,017,045 | A | * 4/1977 | Kirchhein | ............ G05D 1/0808 244/178 |
| 5,112,009 | A | * 5/1992 | Farineau | ................. B64C 13/16 244/181 |
| 5,127,608 | A |   7/1992 | Farineau et al. | |
| 5,365,446 | A | * 11/1994 | Farineau | .............. G05D 1/0638 244/181 |

(Continued)

FOREIGN PATENT DOCUMENTS

| | | |
|---|---|---|
| EP | 0183282 | 6/1986 |
| EP | 2137067 | 1/2011 |

(Continued)

OTHER PUBLICATIONS

European Patent Office, "Extended European Search Report," issued in connection with European Patent Application No. 15192416.4, issued on Apr. 11, 2016, 8 pages.

(Continued)

*Primary Examiner* — Isaac Smith
(74) *Attorney, Agent, or Firm* — Hanley, Flight & Zimmerman, LLC

(57) ABSTRACT

Methods and apparatus to control aircraft horizontal stabilizers are described herein. One described method includes calculating, using a processor, a desired movement of a horizontal stabilizer of an aircraft to counteract a pitching moment of the aircraft, and controlling the horizontal stabilizer based on the desired movement.

13 Claims, 6 Drawing Sheets

(56) References Cited

U.S. PATENT DOCUMENTS 8,489,257 B2 * 7/2013 Holzhausen .............. B64C 9/04
                                                                                                       244/178

FOREIGN PATENT DOCUMENTS

EP          2944566       11/2015
WO      2008110384     9/2008

OTHER PUBLICATIONS

Canadian Intellectual Property Office, "Examiner's Report," issued in connection with Canadian Patent Application No. 2,900,785, issued on Jul. 22, 2016, 3 pages.
Canadian Intellectual Property Office, "Examiner's Report," issued in connection with Canadian Patent Application No. 2,900,785, dated Jun. 1, 2017 (4 pages).

* cited by examiner

METHODS AND APPARATUS TO CONTROL AIRCRAFT HORIZONTAL STABILIZERS

FIELD OF THE DISCLOSURE

This patent relates generally to aircraft and, more particularly, to methods and apparatus to control aircraft horizontal stabilizers.

BACKGROUND

Some aircraft employ control surfaces (e.g., dynamic surfaces, etc.) to control and/or maneuver an aircraft. In particular, elevators, located on horizontal stabilizer(s), are used to maneuver the aircraft longitudinally. However, during aircraft configuration changes (e.g., repositioning of the wing control surfaces, wing lift or drag devices, landing gear, thrust level changes, etc.), these elevators are often used to counteract the resulting change in pitching moment of the aircraft instead of maneuvering the aircraft, thereby reducing the overall maneuverability of the aircraft.

SUMMARY

An example method includes calculating, using a processor, a desired movement of a horizontal stabilizer of an aircraft to counteract a pitching moment of the aircraft, and controlling the horizontal stabilizer based on the desired movement.

An example apparatus includes a motor attached to a horizontal stabilizer of an aircraft, where the motor is to control a pitch angle of the horizontal stabilizer, and a processor to control the motor to counteract a pitching moment of the aircraft.

Another example apparatus includes a first control surface of an aircraft, a second control surface of the aircraft that can move relative to the first control surface, where the second control surface forms a portion of an aerodynamic surface defined by the first control surface, a motor coupled to the first control surface to control a position of the first control surface, and a processor to control the motor to adjust the position of the first control surface to alter a pitching moment induced by a third control surface of the aircraft.

Figure 1:
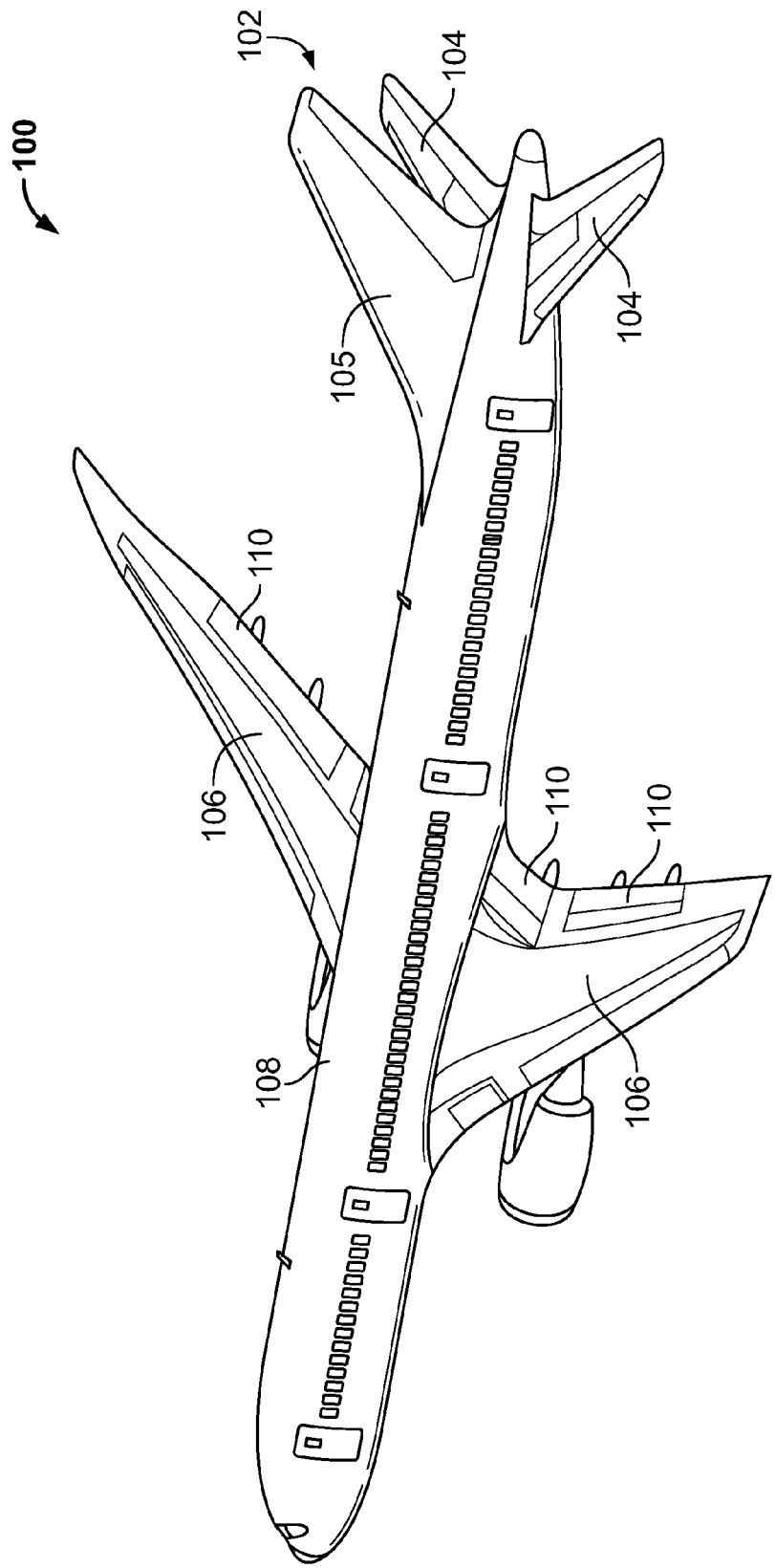
FIG. 1 illustrates an example aircraft that may be used to implement the example methods and apparatus disclosed herein.

Wherever possible, the same reference numbers will be used throughout the drawing(s) and accompanying written description to refer to the same or like parts. As used in this disclosure, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Methods and apparatus to control aircraft horizontal stabilizers are disclosed herein. A change in aircraft configuration (e.g. repositioning of the wing control surfaces, wing lift or drag devices, landing gear, and/or changes to thrust level, etc.) may result in a change of a pitching moment of the aircraft. Such a change in pitching moment may be counteracted by an opposing pitching moment of similar magnitude, for example, to maintain a relatively stabilized flight. This counteracting pitching moment is typically generated by a combination of fast moving elevators that may be located on relatively slower moving horizontal stabilizers. In these examples, the pitching moment imbalance is counteracted primarily by the fast moving elevators. The relatively slower horizontal stabilizers are then positioned to return the elevators back to their original position. This positioning of the elevators to counteract the pitching moment change caused by the change in the aircraft configuration may reduce maneuverability of the aircraft because further positioning of the elevator may be restricted due to mechanical, electronic, or aerodynamic limiting. The examples disclosed herein control and/or move horizontal stabilizers of the aircraft to counteract the pitching moment of the aircraft resulting from the configuration change to allow the elevators to be used in maneuvering the aircraft. Alternatively, the examples disclosed herein may alter and/or increase the pitching moment. The examples disclosed herein also allow use of relatively smaller horizontal stabilizers due to the horizontal stabilizers being used as a primary control surface to counteract the pitching moments resulting from an aircraft configuration change.

In some examples, a degree to which the horizontal stabilizers are positioned (e.g., angled and/or displaced, etc.) is based on table lookup data in relationship to sensor data and/or flight conditions (e.g., measured flight conditions). The table lookup data may be generated by tabulated reference data gathered through numerous aircraft tests and/or calculations. Reference data from within the table lookup data may be accessed via an algorithm that searches the table lookup data based on configuration settings of the aircraft and/or a maneuver being performed by the aircraft. In some examples, the table lookup data may be used by a flight control system to estimate a calculated delta (e.g., an incremental angle change) for the aircraft horizontal stabilizer. In some examples, the table lookup data is updated by sensor measurements taken during flight(s) of the aircraft. Additionally or alternatively, a movement of the horizontal stabilizer as a function of time is determined. In some examples, a rate of movement of the horizontal stabilizer is controlled to more effectively counteract the pitching moment.

As used herein, the term "position" or "movement" in relation to control surfaces, horizontal stabilizers and/or elevators, for example, refers to an angle, a linear displacement, a rotation, a movement of the surface with respect to time, or any appropriate combination of the above. As used herein, the term "move" refers to a change in position, angle or displacement and/or a change in position with respect to time. As used herein, the term "horizontal stabilizer" may refer to a stabilizer component or a horizontal stabilizer assembly, which may also include actuators, motors, electronics, etc. As used herein, the term "configuration change" may refer to, but is not limited to, movement of aircraft control surfaces, in-air speedbrake extension or retraction, repositioning of the wing control surfaces, wing lift or drag devices, landing gear, thrust level changes, and/or any other appropriate aircraft configuration change.

FIG. 1 illustrates an example aircraft 100 in which the examples disclosed herein may be implemented. The aircraft 100 has a tail section 102 with horizontal stabilizers 104 and a dorsal fin 105. The aircraft 100 of the illustrated example also has wings 106 attached to a fuselage 108. The wings 106 of the illustrated example have control surfaces (e.g., flaps, ailerons, tabs, etc.) 110, which are located at trailing edges of the wings 106 and may be displaced or adjusted (e.g., angled, etc.) to provide lift during takeoff, for example. The examples described herein may be applied with respect to control surfaces associated with any of the stabilizers 104, the wings 106 and/or any other exterior or outboard structure (e.g., a wing strut, an engine strut, a canard stabilizer, etc.) of the aircraft 100.

Figure 2:
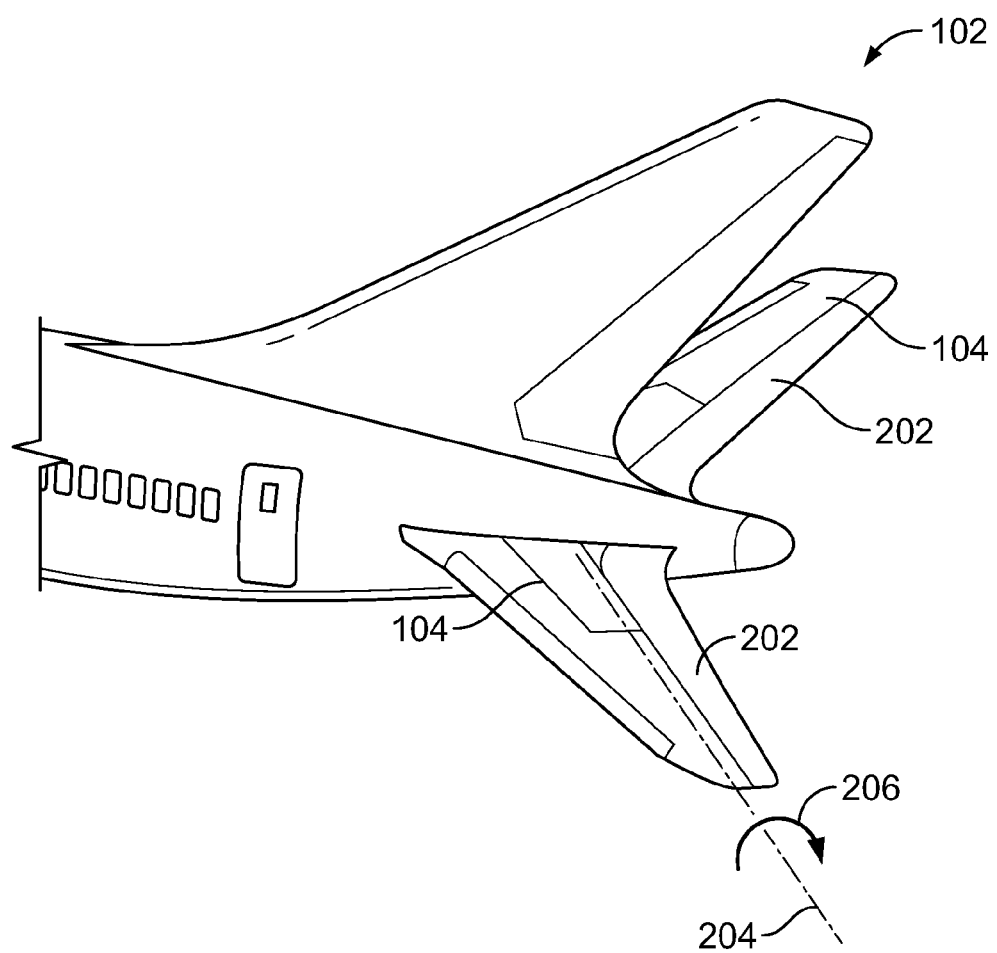
FIG. 2 is a detailed view of a tail section of the aircraft of FIG. 1 in which the examples disclosed herein can be implemented.

FIG. 2 is a detailed view of the tail section 102 of the aircraft 100 of FIG. 1 in which the examples disclosed herein can be implemented. In this example, the horizontal stabilizers 104 have elevators 202, which may be integral with or form a portion of the horizontal stabilizers 104. The elevators 202 of the illustrated example may be moved (e.g., angled, deflected and/or displaced) independently to maneuver the aircraft 100. In some known examples, the elevators 202 are used to counteract a pitching moment of the aircraft 100. In particular, movement and/or deflection of control surfaces of the aircraft (e.g., the control surfaces 110) may induce a pitching moment of the aircraft 100, which the elevators 202 may be moved or displaced to counteract. This utilization of the elevators 202 to counteract the pitching moment in known examples may prevent and/or reduce use of the elevators 202 to maneuver the aircraft 100.

As set forth herein, to counteract and/or alter the pitching moment of the aircraft 100, which may be caused by movement and/or deflections of control surfaces, the horizontal stabilizer 104 of the illustrated example rotates about an axis 204 in a direction generally indicated by an arrow 206 or in an opposite rotational direction. In some examples, the horizontal stabilizers 104 displace and/or rotate at a slower rate of movement than the elevators 202. A degree to which the horizontal stabilizer 104 rotates may be determined by table lookup data, sensor data, and/or flight configuration settings, which will be discussed in greater detail below in connection with FIGS. 3-5.

Figure 3:
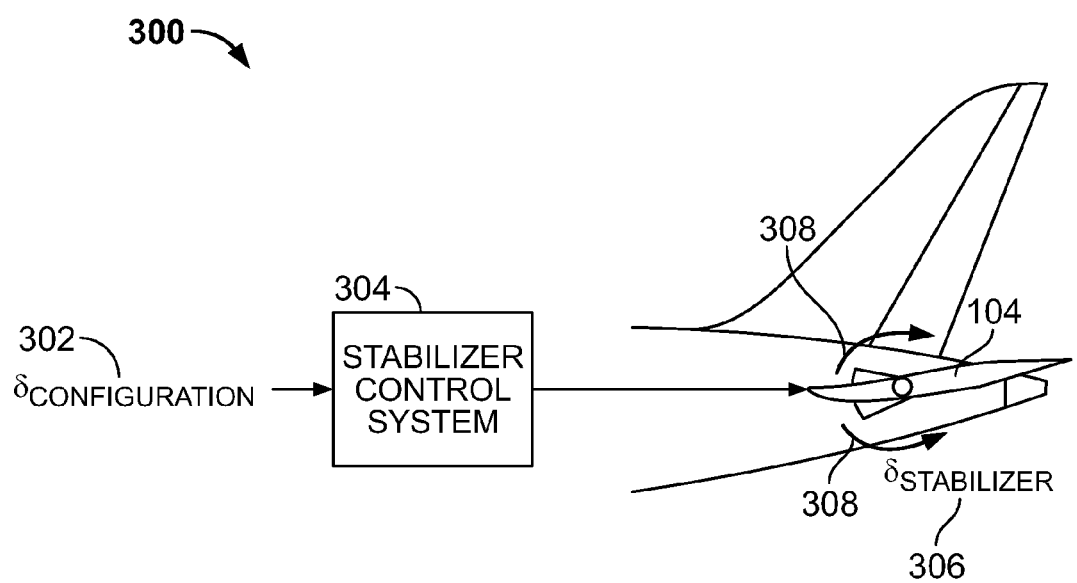
FIG. 3 is a schematic representation of an example flight control system in accordance with the teachings of this disclosure.

FIG. 3 is a schematic representation of an example flight control system 300 in accordance with the teachings of this disclosure. In this example, the flight control system 300 includes a configuration position (configuration pitch setting, configuration angle, configuration delta, position or angle of the stabilizer 104, etc.) 302 of the horizontal stabilizer 104, which is denoted by "$\delta_{configuration}$." The configuration position 302 of the illustrated example corresponds to a stabilizer angle (e.g., a recommended angle, an optimal angle, etc.) for a configuration and/or a maneuver (e.g., a selected maneuver) of the aircraft 100. In particular, the configuration position 302 of the illustrated example is based on an algorithm for detecting and/or receiving signals from flight instrumentation corresponding to a flight configuration and/or a selected maneuver of the aircraft 100 such as an in-air speedbrake extension or retraction, for example. The signals of the illustrated example are used in conjunction with reference table lookup data to determine the configuration position 302. In particular, a flight configuration such as the deployment of speedbrakes, for example, may have a corresponding configuration position of the horizontal stabilizer 104 obtained from table lookup data. In some examples, the table lookup data is a library of several pitching moment inducing aircraft configuration changes correlated to estimated optimal positions or deflections of horizontal stabilizers. These estimated optimal positions may be based on an in-air maneuver, an estimated pitching moment of the aircraft, deployment of lift and/or drag inducing wing surfaces (e.g. speedbrakes, flaps, etc), landing gear deployment, altitude, aircraft weight, aircraft center of gravity, velocity, engine thrust level, and/or deployment or positioning of control surfaces (e.g., control surface positions), etc.

The configuration position 302 of the illustrated example is provided to a stabilizer control system 304 to determine and or calculate a stabilizer position (e.g., a calculated stabilizer displacement, a rate of stabilizer angle movement and/or a calculated stabilizer angle, etc.) 306, which is denoted by "$\delta_{stabilizer}$," to position (e.g., to angle) the horizontal stabilizer 104 to counteract and/or alter a pitching moment of the aircraft 100. In this example, the stabilizer control system 304 takes into account the configuration position 302, aircraft conditions (e.g., external conditions), sensor data and/or any other appropriate aircraft condition(s) to determine the calculated stabilizer position 306. In particular, the stabilizer control system 304 of the illustrated example performs a mathematical operation (e.g., addition, summation, etc.) between the configuration position 302 and a calculated incremental change or delta that is based on flight conditions and/or sensor data to determine the calculated stabilizer position 306 and provides the calculated stabilizer position 306 to a motor controller and/or the actuators or motors associated with the stabilizer 104. The horizontal stabilizer 104 of the illustrated example rotates to the stabilizer position 306 in a direction generally indicated by arrows 308. In some examples, the horizontal stabilizer 104 is rotated prior to an execution of a flight maneuver and/or a flight configuration change. In some examples, sensor data includes, but is not limited to, airspeed, temperature, pressure altitude, positional data (e.g., yaw, pitch and/or roll, etc.) of the aircraft 100, etc.

The degree to which the calculated stabilizer position 306 is based on the configuration position 302, the sensor data, the table lookup data and/or flight configuration data may be varied. In particular, the configuration position 302 and the calculated incremental value (e.g., delta) based on table lookup data may be weighted together in varying degrees to determine and/or calculate the calculated stabilizer position 306 via a summation process. In some examples, the calculated stabilizer position 306 is determined by an algorithm to determine an appropriate motor movement to counteract the pitching moment. In particular, the algorithm may utilize the table lookup data and/or flight configuration data to determine a desired movement of the horizontal stabilizer 104 to counteract an estimated pitching moment induced by aircraft control surfaces. In some examples, the determination of the desired movement is further based on sensor data and/or aircraft configuration. In some examples, determination by the algorithm is based on flight dynamics such as measured pitch, velocity, and/or altitude, etc.

Additionally or alternatively, the calculated stabilizer position 306 may be determined as a function of time (e.g., the calculated stabilizer position 306 is to move to defined positions at defined times, etc.). In particular, the calculated stabilizer position 306 may cause the horizontal stabilizer 104 to move along a determined range of motion with respect to time based on the table lookup data and/or flight configuration data. Additionally or alternatively, this movement of the horizontal stabilizer 104 may have varying rates of movement at different portions of the determined range of motion. In some examples, the calculated stabilizer position 306 is equal to the configuration position 302 (e.g., sensor data and/or flight conditions are not taken into account).

Figure 4:
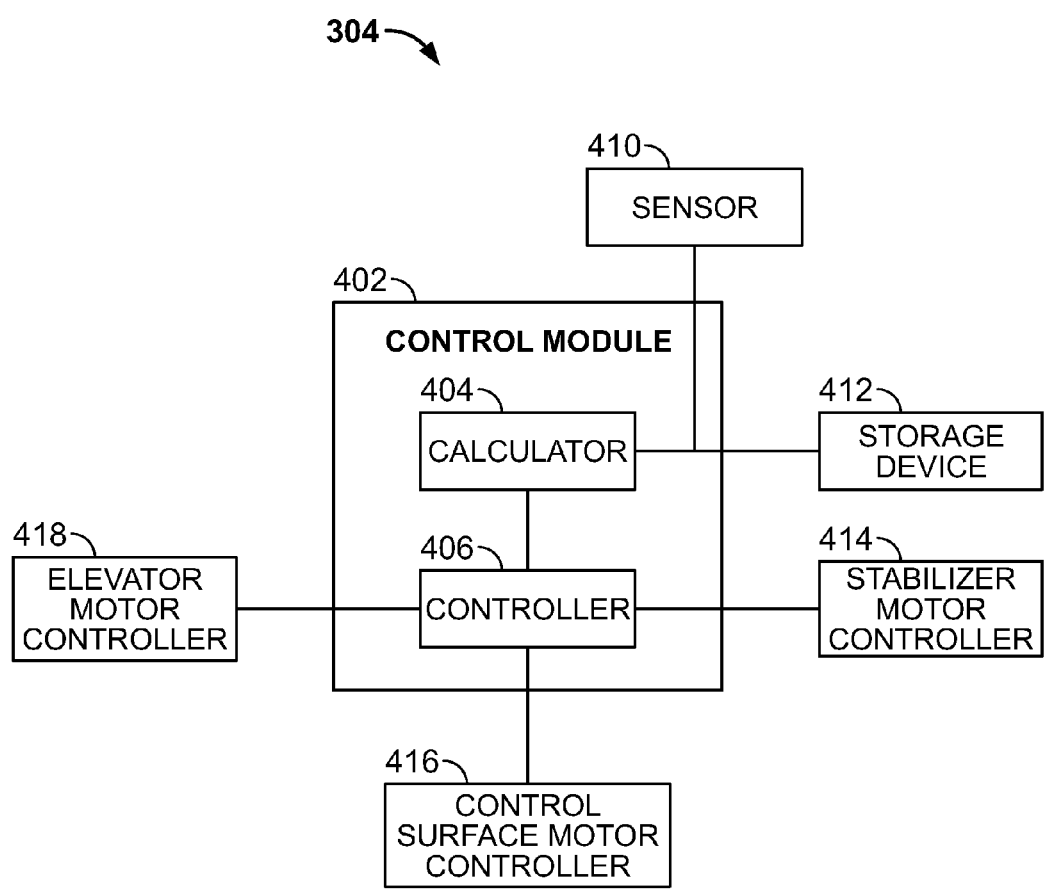
FIG. 4 depicts a stabilizer control system of the example flight control system of FIG. 3.

FIG. 4 illustrates the example stabilizer control system 304 of the flight control system 300 of FIG. 3. In this example, the stabilizer control system 304 determines a position (e.g., a desired position, a desired angle, etc.) or movement (e.g., a desired movement) of the stabilizer 104 to counteract a pitching moment of the aircraft 100, which may be caused by control surfaces of the aircraft 100 during an in-air maneuver. The stabilizer control system 304 of the illustrated example includes a control module 402 having a calculator 404 and a controller 406. In this example, the control system 304 also includes a sensor (e.g., an accelerometer, a gyroscope, a visual sensor, a Pitot tube, etc.) 410, and a storage device 412 to store table lookup data. In this example, the controller 406 and, more generally, the stabilizer control system 304 is coupled to a stabilizer motor controller 414, a control surface motor controller 416 and an elevator motor controller 418.

In this example, the control module 402 determines and/or receives a configuration position such as the configuration position 302 described above in connection with FIG. 3 based on an in-air maneuver of the aircraft 100 via a table lookup of reference data. The calculator 404 of the illustrated example calculates an increment (e.g., a delta) to be added (e.g., summed) to the configuration position to determine and/or calculate a calculated stabilizer position such as the calculated stabilizer position 306 for counteracting a pitching moment of the aircraft 100. The calculator 404 of the illustrated example may use the in-air maneuver, an aircraft configuration, the table lookup data, sensor data from the sensor 410, settings and/or data received from the control surface motor controller 416 to determine the calculated stabilizer position. In this example, the controller 406 is communicatively coupled to the stabilizer motor controller 414 to control the horizontal stabilizers 104 of the aircraft 100 by providing the calculated stabilizer position to the stabilizer motor controller 414, for example. The controller 406 of the illustrated example controls the elevators 202 via the elevator motor controller 418 to maneuver the aircraft 100 while the horizontal stabilizers 104 are used to counteract the pitching moment of the aircraft 100.

Figure 5:
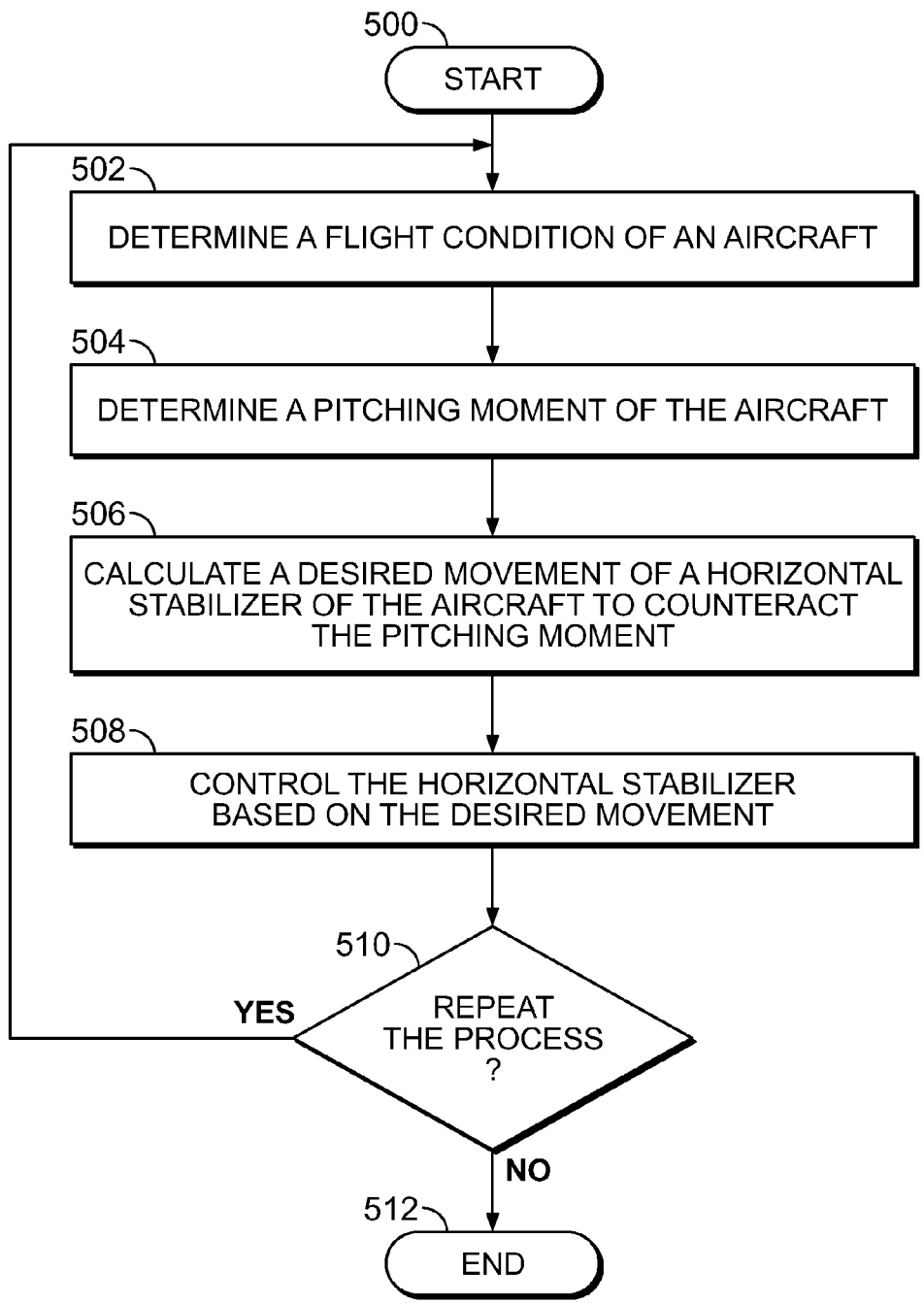
FIG. 5 is a flowchart representative of an example method that may be used to implement the example stabilizer control system of FIG. 4.

A flowchart representative of an example method for implementing the example flight control system 300 of FIG. 3 is shown in FIG. 5. In this example, the method may be implemented using machine readable instructions that comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the flight control system 300 may alternatively be used. For example, the order of execution of the blocks may be changed, and/or some of the blocks described may be changed, eliminated, or combined.

As mentioned above, the example method of FIG. 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method of FIG. 5 begins at block 500 where an aircraft is executing and/or beginning to execute an in-air aircraft configuration change, for example (block 500). In some examples, a flight condition is determined at a sensor such as the sensor 410 described above in connection with FIG. 4 (block 502). Such a determination may be initiated in response to a threshold time being exceeded after the aircraft has executed the in-air aircraft configuration change, for example. In other examples, this determination results from monitoring flight parameters and/or control systems. Next, in some examples, a pitching moment of the aircraft is determined by a calculator (e.g., the calculator 404) (block 504). In this example the pitching moment is estimated from table lookup data such as a data library related to several in-air maneuvers, aircraft configurations and/or flight conditions. In particular, the table lookup data may be referenced based on a type of the aircraft, a velocity, configuration settings, a maneuver type, weight of the aircraft and/or external conditions of the aircraft to determine the pitching moment.

A desired position (e.g., a pitch, an angle, etc.) or movement of the horizontal stabilizer is determined and/or calculated based on the table lookup data including recommended stabilizer positions or angles based on in-air maneuvers, for example (block 506). In particular, this determination may use a summing operation at a calculator (e.g., the calculator 404) between a configuration angle (e.g., the configuration position 302) based on an in-air maneuver and/or configuration settings of the aircraft, for example, and an increment (e.g., a delta) determined from flight conditions and/or sensor data. Additionally or alternatively, the increment is determined based on table lookup data. In some examples, the calculator may use positional and/or displacement data from a control surface motor controller such as the control surface motor controller 416 to determine the increment by calculating or determining a predicted pitching moment based on the data from the control surface motor controller, for example. In some examples, the desired stabilizer position is entirely based on table lookup data (e.g., solely based on the table lookup data). In some examples, the table lookup data to determine the desired stabilizer position may take into account aircraft conditions, sensor measurements, etc.

The horizontal stabilizer of the illustrated example is then controlled and/or adjusted based on the desired movement or position (block 508). In this example, a controller (e.g., the controller 406) controls a stabilizer motor controller (e.g., the stabilizer motor controller 414) and/or a stabilizer motor to move the horizontal stabilizer to the desired movement. Next, it is determined whether the process is to be repeated (block 510). In some examples, whether the process is to be repeated is based on whether the aircraft is no longer in a configuration change (e.g., the aircraft has finished the in-air aircraft configuration change and/or maneuver(s), etc.). In other examples, the process is ended based on a measured parameter reaching a threshold (e.g., a speed sensor measures an aircraft speed less than a defined threshold, etc.). If the process is determined to be repeated (block 510), control returns to block 502. If the process is determined not to be repeated (block 510), the process ends (block 512).

Figure 6:
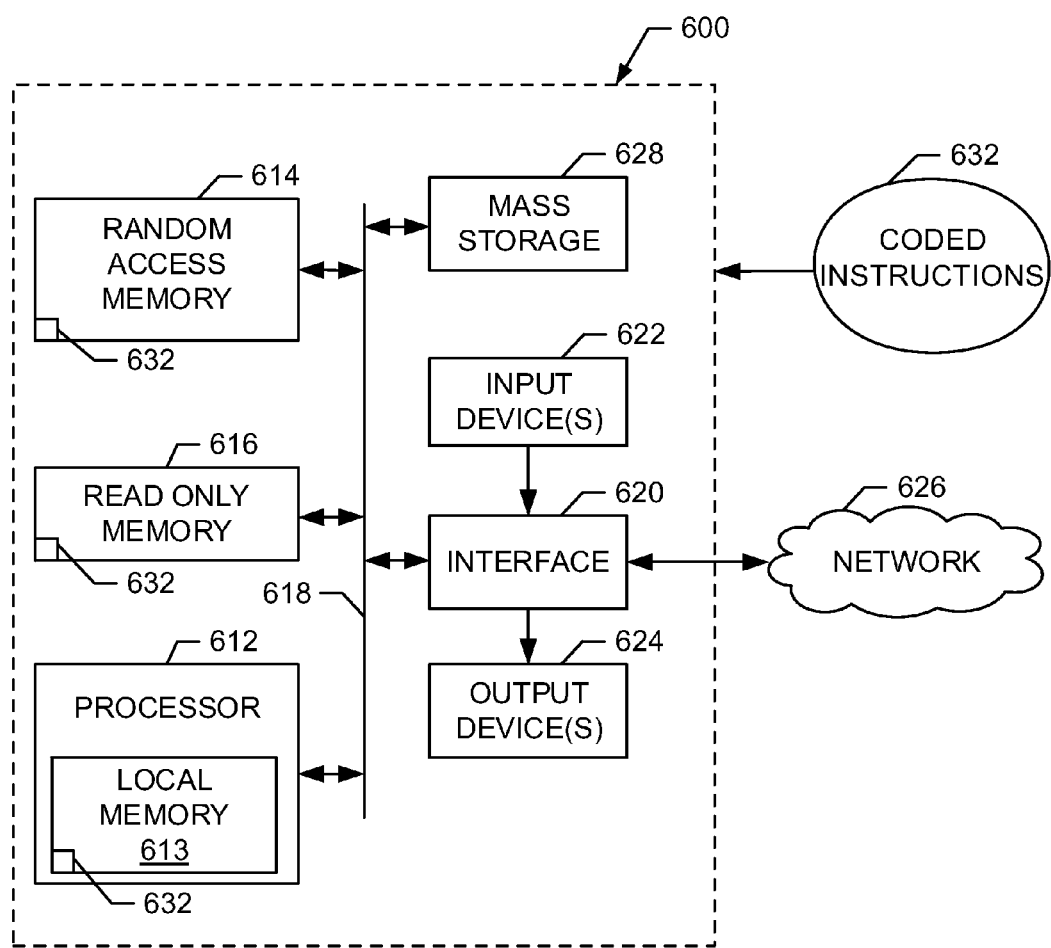
FIG. 6 is a block diagram of an example processor platform capable of executing machine readable instructions to implement the example method of FIG. 5.

FIG. 6 is a block diagram of an example processor platform 600 capable of executing instructions to implement the method of FIG. 5 and the flight control system 300 of FIG. 3. The processor platform 600 can be, for example, a server, a personal computer, a mobile device (e.g., a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory including the volatile memory 614 and the non-volatile memory 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

Coded instructions 632 to implement the method of FIG. 5 may be stored in the mass storage device 628, in the volatile memory 614, in the non-volatile memory 616, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While aircraft are described, the example apparatus may be applied to vehicles, aerodynamic structures, etc. While the examples described have been primarily described in conjunction with braking maneuvers of an aircraft, the examples may be applied to takeoff, cruise, landing, or any other appropriate aircraft maneuver. While pitching moments are described, the examples disclosed herein may be used in conjunction with and/or to reduce or increase any other appropriate aerodynamic characteristic.

What is claimed is:

1. A method comprising:
 deflecting a control surface of an aircraft to maneuver the aircraft;
 measuring flight sensor data associated with the maneuver;
 accessing table lookup data to identify a pitching moment associated with the maneuver;
 calculating, with a processor, a desired coordinated movement of a horizontal stabilizer and an elevator of the aircraft by weighting the flight sensor data and the identified pitching moment together, the desired movement corresponding to a first deflection of the horizontal stabilizer and a second deflection of the elevator to counteract the pitching moment; and
 moving the elevator to the second deflection and the horizontal stabilizer to the first deflection.

2. The method as defined in claim 1, wherein calculating the desired coordinated movement of the horizontal stabilizer and the elevator is further based on one or more of a velocity of the aircraft, deployment of one or more control surfaces, a type of maneuver, or positions of control surfaces of the aircraft.

3. The method as defined in claim 1, wherein a degree to which the horizontal stabilizer is moved is based on a configuration change of the aircraft.

4. The method as defined in claim 1, wherein measuring the flight sensor data associated with the maneuver includes measuring the pitching moment of the aircraft.

5. The method as defined in claim 1, further including calculating the pitching moment based on the table lookup data.

6. An apparatus comprising:
   a first motor operatively coupled to a horizontal stabilizer of an aircraft, the motor to control a pitch angle of the horizontal stabilizer;
   a second motor operatively coupled to an elevator of the aircraft;
   a sensor to measure flight sensor data associated with the aircraft; and
   a processor to identify a pitching moment based on table lookup data, the processor to calculate a coordinated first movement of the first motor with a second movement of the second motor based on weighting the identified pitching moment and the flight sensor data together to counteract the pitching moment of the aircraft.

7. The apparatus as defined in claim 6, wherein the processor is to further control a rate of movement of at least one of the first or second motors.

8. An apparatus comprising:
   a first control surface of an aircraft;
   a second control surface of the aircraft that can move relative to the first control surface, wherein the second control surface forms a portion of an aerodynamic surface defined by the first control surface;
   a first motor operatively coupled to the first control surface to control a position of the first control surface;
   a second motor operatively coupled to the second control surface to control a position of the second control surface;
   a third control surface to maneuver the aircraft;
   a third motor operatively coupled to the third control surface to control a position of the third control surface;
   a sensor to measure flight sensor data associated with the maneuver; and
   a processor to identify a pitching moment based on table lookup data, the processor to control a coordinated movement of the first motor and the second motor by weighting the flight sensor data with the identified pitching moment together to counteract the pitching moment.

9. The apparatus as defined in claim 8, wherein the first control surface is a horizontal stabilizer and the second control surface is an elevator.

10. The apparatus as defined in claim 9, wherein the elevator is to rotate at a faster rate than the horizontal stabilizer.

11. The apparatus as defined in claim 8, wherein control of at least one of the first or second motors is based on one or more of the maneuver, the calculated pitching moment of the aircraft, or an external condition of the aircraft.

12. The apparatus as defined in claim 8, wherein the first control surface is to counteract a motion of the aircraft while the second control surface is to maneuver the aircraft.

13. The apparatus as defined in claim 8, wherein the processor is to control a rate of movement of at least one of the first or second motors.

\* \* \* \* \*